No. 631,506. Patented Aug. 22, 1899.
J. JORGENSON.
NUT LOCKING DEVICE.
(Application filed May 17, 1899.)

(No Model.)

Witnesses,

Inventor,
John Jorgenson

UNITED STATES PATENT OFFICE.

JOHN JORGENSON, OF SAN FRANCISCO, CALIFORNIA.

NUT-LOCKING DEVICE.

SPECIFICATION forming part of Letters Patent No. 631,506, dated August 22, 1899.

Application filed May 17, 1899. Serial No. 717,139. (No model.)

*To all whom it may concern:*

Be it known that I, JOHN JORGENSON, a citizen of the United States, residing in the city and county of San Francisco, State of California, have invented an Improvement in Nut-Locking Devices; and I hereby declare the following to be a full, clear, and exact description of the same.

My invention relates to a means for locking nuts upon the ends of axles or shafts or for other like purposes.

It consists, essentially, in the combination, with a nut having a slot made in the outer end, of a spring-pressed lever fulcrumed to one side of the nut, having the outer end diagonally beveled, and an axle or shaft the end of which has V-shaped locking-notches formed in the angle of the end in such a manner that the locking takes place from the end and side.

It also comprises details of construction, which will be more fully explained by reference to the accompanying drawings, in which—

Figure 1:
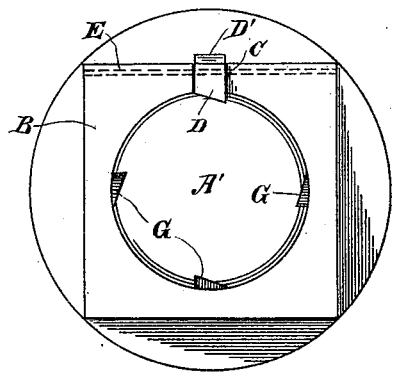
Figure 2:
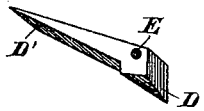
Figure 3:
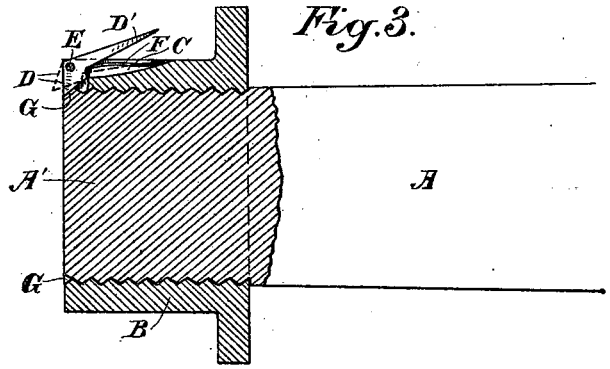

Figure 1 is an end view of the axle and its nut. Fig. 2 is a detail view of the latch. Fig. 3 is a longitudinal section through the axle and nut, showing my locking device.

The object of my invention is to provide a locking device for nuts which are especially used upon vehicle axles, shafts, or bolts, where the nuts fit upon the end and it is desirable to prevent their turning off at undesirable times, and to so construct the device that the lock can be easily disengaged when it is desired to move the nut.

In my present device I have shown the invention as applied to a vehicle-axle, of which A is the spindle, having the threaded end A', and B is a nut adapted to screw upon this end. Nuts for vehicle uses are usually made with a square body projecting from a circular flange, the flange fitting against the outer end of the box in the hub and the square portion of the nut serving for the application of a wrench by which the nut is turned on or off. In one side of this nut is formed a groove or channel C, the outer end of which is vertical or parallel with the end of the nut, and upon the side of the nut this channel extends toward the inner end of the nut, gradually decreasing in depth until it vanishes in the surface of the side of the nut. Within this groove or channel is fitted a pawl-lever which consists of a beveled end or latch D, which fits into the outer portion of the slot or channel C and is pivoted therein by a pin passing through a hole E. The part D', extending along the inclined portion of the channel in the nut, is made correspondingly tapering in shape, as shown, and gradually decreasing in thickness from a point adjacent to the pivot to the inner end. Beneath this inclined portion is fixed a spring F, which presses this part outwardly with reference to the side of the nut, and thus turning the beveled portion D in the opposite direction it is forced diagonally against the end of the spindle A. G G are V-shaped grooves or channels formed in the angle where the side and end of the spindle meet. These grooves are made with a longer incline on one side than the other, and the beveled side of the latch or pawl D coincides with these beveled sides. The opposite or vertical side of the latch corresponds with the opposite sides of the grooves, which are more nearly radial from the center of the spindle.

When the nut is to be applied, it is turned on in the usual manner by a wrench, and the latch or pawl D will move freely over the notches G, by reason of the bevel upon one side and the corresponding shape of the notches, until the nut is screwed onto the desired seat or point of adjustment, and the spring F, acting against the longer lever-arm D', causes the latching portion to fall into the notches and to be very securely locked therein, so that the nut cannot be turned in the opposite direction without releasing this latch. When the nut is to be removed, the wrench is slipped over the end of the nut, and by reason of the outer end of the latch-lever being nearly or quite flush with the end of the nut a wrench of any description can be slipped over it, and as it is moved toward the inner end of the nut it presses the end D' of the lever down flush with the surface of the nut, thus raising the outer or latch end D until it is disengaged and free from the notches G. The nut can then be turned by the wrench and moved like any ordinary nut. By thus making the latch it will automatically lock the nut at any desired point, giving the greatest possible strength to the lock by reason of the diagonal position of the notches and of the latch with reference thereto, and the inner end of the lever is easily engaged by the wrench, so as to depress it and hold the latch out of engagement as long as the wrench remains upon the nut.

Having thus described my invention, what I claim as new, and desire to secure by Letters Patent, is—

1. In a nut-locking device, a channel made in the side and end of the nut, a latch-lever fulcrumed in said channel having a long arm extending substantially horizontally along the channel upon the side of the nut, and a short arm inclined and beveled and fitting the channel in the end of the nut, a shaft or spindle having notches made around it in the angle formed by the sides and end and adapted to be engaged by the latch and a spring by which the latch is normally held in engagement with either of the notches.

2. In a nut-locking device, a shaft or spindle having beveled notches formed at the angle between the sides and end of the spindle, a nut turnable upon threads upon the spindle end, said nut being open at its outer end and having a channel made in the end, and a corresponding channel connecting therewith and extending toward the inner end of the nut with a gradually-decreasing depth, a correspondingly-shaped angle-lever fulcrumed in said nut and having a long arm adapted to lie in said channel, a spring by which the inner end of the lever is normally forced outwardly, a latch formed at the opposite end or short arm of the lever, said latch having a transversely-inclined and beveled face adapted to move over the notches of the spindle in one direction and to engage and lock therewith when moved in the opposite direction.

3. In a nut-lock, a spindle having the inclined beveled notches formed around the angle of the end, a nut having rectangular exterior faces, a bell-crank latch-lever fulcrumed in a slot formed in one of the faces and the end of the nut, one end of said latch being transversely beveled to engage the notches in the end of the spindle, the other end or long arm tapered and extending along the side of the nut, a spring by which this end is normally forced outwardly to cause the latch to engage with the notches of the spindle, said arm being depressed by the placing of the wrench upon the nut whereby the latch is disengaged and the nut is turnable to remove it.

In witness whereof I have hereunto set my hand.

JOHN JORGENSON.

Witnesses:
S. H. NOURSE,
JESSIE C. BRODIE.